J. ZAJAC.
AUTOMATIC BABY CARRIAGE.
APPLICATION FILED MAR. 9, 1908.

915,149.

Patented Mar. 16, 1909.
2 SHEETS—SHEET 1.

WITNESSES:
John McCarthy
Rudolph Winkler

INVENTOR
Julius Zajac
BY
Robt. Klotz
ATTORNEY

J. ZAJAC.
AUTOMATIC BABY CARRIAGE.
APPLICATION FILED MAR. 9, 1908.

915,149.

Patented Mar. 16, 1909.
2 SHEETS—SHEET 2.

WITNESSES:
John McCarthy
Rudolph Winkler

INVENTOR
Julius Zajac
BY
Robt. Klotz
ATTORNEY

UNITED STATES PATENT OFFICE.

JULIUS ZAJAC, OF CHICAGO, ILLINOIS.

AUTOMATIC BABY-CARRIAGE.

No. 915,149.  Specification of Letters Patent.  Patented March 16, 1909.

Application filed March 9, 1908. Serial No. 419,952.

*To all whom it may concern:*

Be it known that I, JULIUS ZAJAC, a subject of the Emperor of Germany, and a resident of Chicago, in the county of Cook and State of Illinois, have invented a new and useful Improvement in Automatic Baby-Carriages, of which the following is a complete specification.

This invention relates to improvements in automatic baby carriages and more particularly to a baby carriage provided with self propelling and automatic reversing mechanisms.

In the care of infants it is a well known fact that constant motion of the infant ofttimes has a quieting effect, and it is customary to place the infant in a cab or carriage and manually wheel it back and forth. Such an operation is not only tiresome but it prevents the operator from performing many other duties while caring for the infant.

The object of this invention is to provide a baby carriage or the like, having self propelling and reversing mechanism thereon adapted to move the carriage alternately forward and backward over a limited distance without the constant care of an attendant.

It is also an object of the invention to provide means for throwing the self propelling and reversing mechanisms out of operation so that the carriage may be propelled manually in the usual manner when it is desired to run the carriage in but one direction.

It is also an object of the invention to provide a reciprocating baby carriage having means adapted to cushion its movement at both its forward and backward limit, thereby preventing any jar or jerking of the infant due to the sudden reversal of movement.

It is a still further object of the invention to provide an automatic reversing mechanism equally adapted for use upon various toys or vehicles other than baby carriages where it is desired to produce a reciprocating travel.

The invention consists of the matters hereinafter described in the specification and more fully pointed out and defined in the claims.

Figure 1:
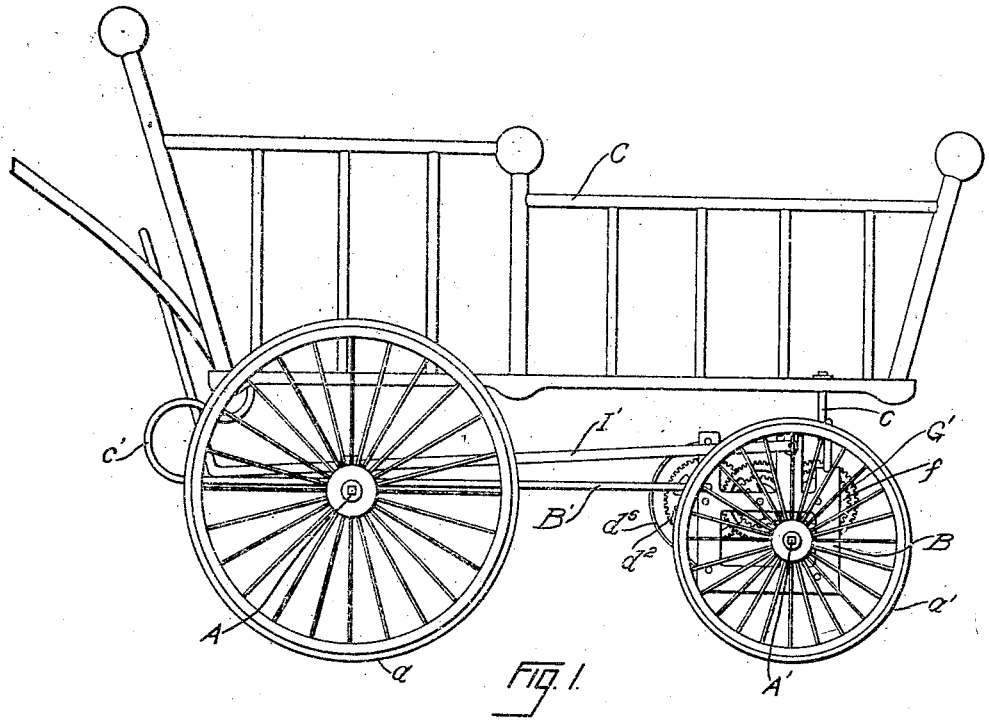
Figure 2:
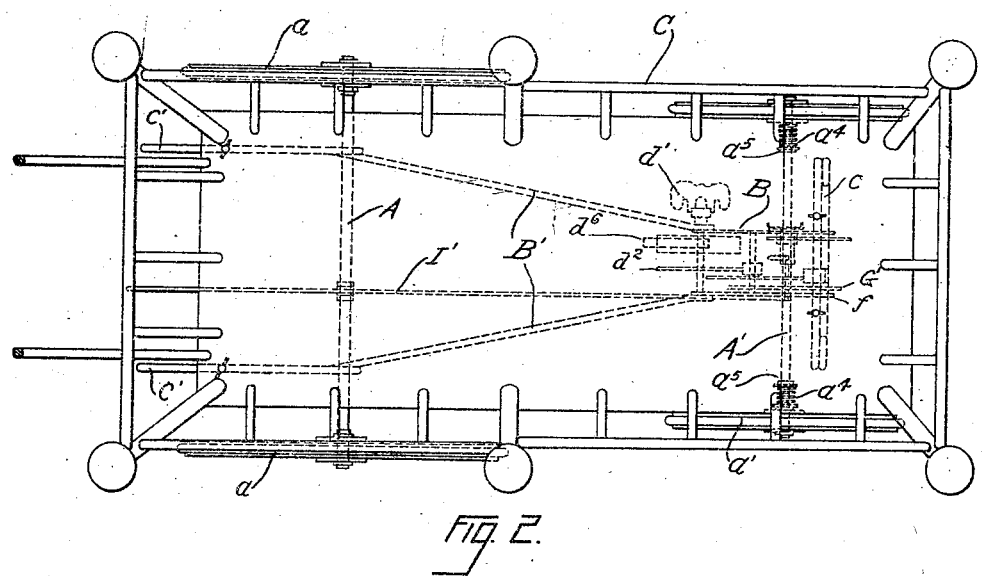
Figure 3:
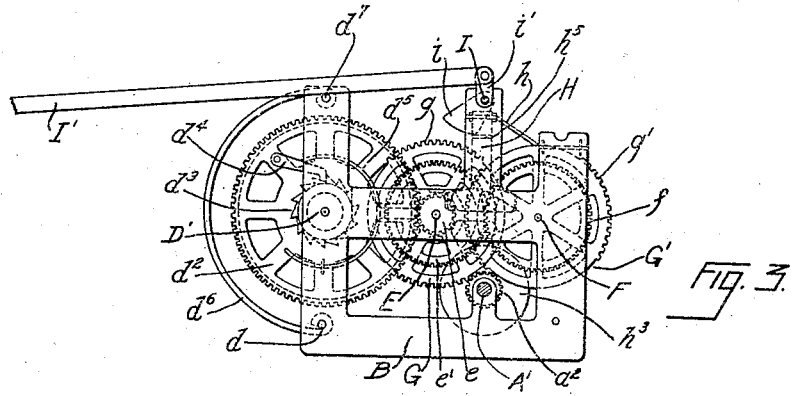
Figure 4:
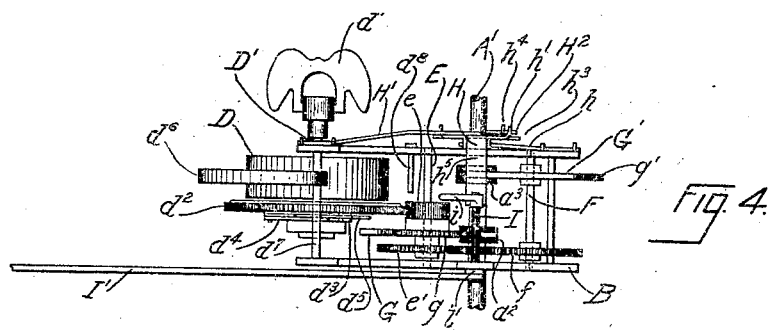
Figure 5:
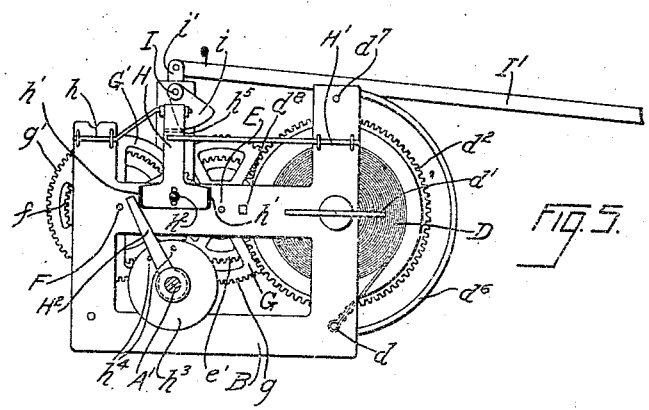

In the drawings: Figure 1 is a side elevation of a baby carriage embodying my invention. Fig. 2 is a top plan view of the same. Fig. 3 is a side elevation of the automatic propelling and reversing mechanism. Fig. 4 is a top plan view of the same. Fig. 5 is a side elevation of the opposite side of said mechanism from that shown in Fig. 3.

As shown in said drawings: A indicates the rear axle, having wheels $a$ of any preferred construction journaled thereon, and A' indicates the front axle having wheels $a'$ journaled thereon. A frame B of any preferred construction is mounted on the front axle, which is journaled therein, and in said frame is mounted the propelling and reversing mechanism to be hereinafter described. Brace bars B' are engaged at their forward ends to said frame B and at their rear ends are engaged to said rear axle. A body or basket C is engaged in any preferred manner upon front and rear springs $c$ and $c'$, which are mounted respectively upon the frame and the rear axle, as shown more clearly in Figs. 1 and 2.

Any preferred means may be provided to furnish the motor power but, as shown, a coiled spring D is engaged at one end to a shaft D' journaled in the frame, and at its other end is engaged to a transverse bar or rod $d$ near the bottom of the frame. Said shaft D' is provided with a suitable key $d'$ by means of which the spring may be wound up, and at one side of said spring is a drive gear $d^2$ journaled on said shaft. A ratchet $d^3$ is rigidly engaged on the shaft adjacent said gear, and a pawl $d^4$, having a spring $d^5$, is pivoted on the gear and is adapted to engage said ratchet and drive the gear when the shaft is rotated by said spring. A shaft E is journaled in said frame, forwardly of the drive gear $d^2$, and is provided with a pinion $e$ meshing with said gear and by means of which the shaft is rotated. A gear $e'$ is rigidly engaged on the shaft E and meshes with and drives oppositely a similar gear $f$ which is rigidly engaged on a shaft F, journaled in the forward part of the frame.

Rigidly engaged on the shaft E is a double segment gear G, having diametrically disposed sets of teeth thereon, each of which extends slightly less than one fourth of the circumference of the gear. A like double segment gear G' is rigidly engaged on the shaft F and is likewise provided with two sets of diametrically disposed teeth $g'$, and owing to the fact that the shaft F is driven oppositely from the shaft E said gear G' rotates oppositely from the gear G.

Two pinions, $a^3$ and $a^3$, are rigidly engaged on the axle A' in alinement with the gears G and G' respectively and are adapted to mesh with the teeth $g$ and $g'$. Said double segment gears are so arranged on their shafts that when the teeth of one of the same are in mesh with the corresponding pinion on the axle A', the teeth on the other are out of mesh with its pinion with the intervening space between the sets of teeth adjacent to said pinion, with the result that the gears G and G' act to alternately rotate the axle A' in opposite directions.

Any preferred means may be provided for stopping and starting the propelling mechanism but, as shown, a stop lever H is pivoted on an arm $h$ which is engaged on the frame and supports said lever above the axle A'. The lower end of said lever is provided with outwardly directed lugs $h'$ and a pin $h^2$ is carried on the frame and extends through a suitable slot or aperture in the lower end of the lever and is provided with a head thereon adapted to limit the outward swing of the lever. Any preferred means may be provided to normally hold the lower end of said lever at the inner limit of its movement, but as shown a spring H' is engaged on the frame and bears against the lever and holds it against the frame. Rigidly engaged on the axle A' beneath said lever is a plate $h^3$ or any other preferred means on which are two outwardly directed pins $h^4$, and loosely engaged on the axle is an arm H² extending upwardly between said pins into position to engage said lugs when the lever is at the inner limit of its movement and prevent the axle from turning. Said lever may be operated in any preferred manner but, as shown, it is provided with an arm extending inwardly over the frame, and a shaft I is journaled in the frame above said arm and is provided with a cam $i$ adapted to engage said arm when the shaft is rotated and, by forcing it downwardly, thereby move the lower end of the lever outwardly and release the arm H², and permit the axle to rotate. Said shaft I is provided with a vertical arm $i'$ to which is engaged one end of an adjoining bar or rod I' which extends to the rear of the carriage into position to be engaged by the operator.

For the purpose of preventing the spring D from unwinding too far a rearwardly extending bow $d^6$ is engaged at one end to the bar $d$ and at the other end to a bar $d^7$ on the frame above the spring, and limits the rearward expansion of the spring, and a pin $d^8$ is engaged in the frame forwardly of the spring and limits the forward expansion thereof.

For the purpose of reducing the jolt or jar on the carriage caused by the reversal of the mechanism, the axle A' is provided with coiled springs $a^4$ which bear at their inner ends against collars $a^5$ on the axle and at their outer ends bear against the wheels $a'$ with sufficient force to cause the wheels to turn with the axle when the axle is rotated, but when the axle is reversed the wheels may rotate on the axle enough to prevent the sudden stopping of the carriage.

The operation is as follows: When it is desired to set the automatic propelling and reversing mechanism in operation to reciprocate the carriage, the bar I' is pulled rearwardly, thereby partially rotating the shaft I and causing the cam $i$ to force the arm $h^5$ downwardly and throw the lever H out of the path of the arm H², thereby permitting said lever to pass between the arm and the frame into contact with the pin $h^2$. When said arm H² is in engagement with the forward side of the lever H, as shown in Fig. 5, the last tooth of one of the sets of teeth on the gear G is in engagement with the pinion $a^2$ as shown in Fig. 3, and as said arm is released the gear tooth passes out of engagement with its pinion and the first gear tooth of one of the sets of teeth on the gear G' comes into engagement with the pinion $a^3$ and that set acting on said pinion reverses the rotation of the axle. When that set has passed the pinion $a^3$ the gear G again drives the axle in the opposite direction, and the operation is repeated by the alternate gear connections between said gears and the axle. When one set of teeth of one gear passes from its pinion, another set of teeth on the other gear engages the other pinion on the axle and thereby reverses the axle, and as such reversal takes place the arm H² contacts with the pin $h^2$ and diminishes the strain on the gear teeth. Owing to the slight movement permitted the arm H² between the pins $h^4$, the mechanism is stopped just before the reversing movement when the arm comes in contact with the lever, and when released sufficient movement of the axle is permitted to insure the other gear coming into engagement with the pinion.

Obviously a reversing mechanism embodying my invention is adapted for use upon any other devices than baby carriages, and any desired means may be employed to provide the motor power. Obviously also many details of construction may be varied without departing from the principles of my invention.

I claim as my invention:

1. The combination with an axle of segment gears adapted to rotate the same alternately in opposite directions, and means adapted to start and stop said gears.

2. The combination with an axle of means adapted to rotate the same in opposite directions, an arm on said axle and adjustable means adapted when in one position to engage said arm and hold the axle from movement and when in another position to permit said arm to oscillate.

3. In a device of the class described the combination with the running gear of a carriage, of mechanism connected therewith adapted to move the carriage alternately backward and forward, an oscillating arm on said mechanism and means adapted to be moved into and out of the path of said arm for throwing said mechanism into and out of operation.

4. In a device of the class described the combination with the running gear of a carriage of mechanism thereon adapted to move the carriage with a reciprocating motion an oscillating arm on said mechanism and a stop lever adapted to control said arm and throw said mechanism into and out of action.

5. In a device of the class described the combination with the running gear of a carriage of means thereon adapted to propel the carriage, automatic means adapted to intermittently reverse the carriage, an oscillating arm and means adapted when in one position to limit the movement of said arm and stop the propelling means.

6. In a device of the class described the combination with the running gear of a carriage, of automatic means thereon adapted to intermittently drive said carriage in opposite directions, an oscillating arm connected with said means a stop lever controlling said arm and means for operating said lever.

7. In a device of the class described the combination with an axle, of propelling means therefor, segment gears connecting said propelling means with the axle and adapted to drive the axle in opposite directions and controlling means adapted to start and stop the propelling means.

8. In a device of the class described the combination with the front and rear axles of a vehicle, of a frame on one of the same, a spring motor in said frame, a gear connection between said motor and axle adapted to drive the axle intermittently in opposite directions, a stop lever pivoted on the frame and means on the axle adapted to normally engage said lever and hold the axle from rotation.

9. In a device of the class described the combination with the front and rear axle, of a spring motor, a frame supporting said motor, a pair of double segment gears in said frame, means connecting said gears with the motor and adapted to drive the same in opposite directions, pinions on one of said axles adapted to be alternately driven by said segment gears, an arm on said axle and means adapted to be thrown into and out of engagement with said arm and start and stop the motor.

10. In a device of the class described the combination with an axle, of a pair of pinions thereon, a pair of double segment gears supported adjacent said axle and adapted to alternately engage said pinions, means for driving said gears oppositely, an arm on said axle, a lever adapted when in one position to engage said arm and hold the axle from rotation, and means adapted to throw said lever out of the path of said arm.

11. In a device of the class described the combination with the running gear having front and rear axles, of a frame supported adjacent one of said axles, a pair of pinions on said axle, a pair of double segment gears supported in the frame and each adapted to engage one of said pinions when the other is out of engagement with the other pinion, means adapted to drive said segment gears oppositely, an arm on the axle, a lever pivoted on the frame and means adapted to throw said lever into and out of engagement with said arm.

12. In a device of the class described the combination with the front and rear axles, of wheels journaled thereon, springs adapted to normally retard the rotation of the wheels on one of said axles, mechanism on said axle adapted to intermittently rotate it in opposite directions, and means for throwing said mechanism into and out of operation.

In testimony whereof I have hereunto subscribed my name in the presence of two witnesses.

JULIUS ZAJAC.

Witnesses:
JOSEPH SCHLENKER,
ROBT. KLOTZ.